United States Patent [19]

Cook et al.

[11] 4,190,565
[45] Feb. 26, 1980

[54] FILLED HOT-MELT ADHESIVES CONTAINING MODIFIED POLYETHYLENE

[75] Inventors: Mary J. Cook; Kenneth W. Hyche, both of Kingsport, Tenn.

[73] Assignee: Eastman Kodak Company, Rochester, N.Y.

[21] Appl. No.: 938,157

[22] Filed: Aug. 30, 1978

[51] Int. Cl.$^2$ ............................................... C08K 3/34
[52] U.S. Cl. .................................... 260/27 R; 260/42; 260/42.46; 525/185
[58] Field of Search ........................... 260/42.46, 27 R

[56] References Cited

U.S. PATENT DOCUMENTS

| | | | |
|---|---|---|---|
| 2,894,925 | 7/1959 | Morris et al. | 260/27 R |
| 3,480,580 | 11/1969 | Jozner et al. | 260/878 X |
| 3,481,910 | 12/1969 | Brunson | 260/878 X |
| 3,691,120 | 9/1972 | Susuki et al. | 260/42.46 X |
| 3,701,760 | 10/1972 | Hazemeyer et al. | 526/25 X |
| 3,856,889 | 12/1974 | McConnell | 260/45.7 S |

*Primary Examiner*—Sandra M. Person
*Attorney, Agent, or Firm*—Clyde L. Tootle; Daniel B. Reece, III

[57] ABSTRACT

The hot-melt adhesives of the present invention comprise a blend of at least one modified polyethylene resin, at least one filler and a tackifying resin. This hot-melt adhesive has a novel combination of properties including excellent aging properties in combination with improved strength, low viscosity, and elevated temperature resistance properties.

10 Claims, No Drawings

FILLED HOT-MELT ADHESIVES CONTAINING MODIFIED POLYETHYLENE

This invention relates to filled hot-melt adhesives containing modified polyethylene. One aspect of this invention concerns a filled hot-melt adhesive containing modified polyethylene having a novel combination of properties. Another aspect of this invention concerns a filled hot-melt adhesive containing modified polyethylene that has long term bond aging properties in combination with improved strength and non-sag properties, low viscosities, and also improved economics.

Hot-melt adhesives are widely used in industry for various applications.

Many hot-melt applications, because of the volume and economics involved, utilize a high concentration of low cost mineral fillers. These areas include hot-melt carpet backing, thermoplastic highway marking, automotive sound deadening, and caulks and sealants. Fillers such as $CaCO_3$, $TiO_2$, tac, and clay may be used in concentrations ranging from 40–70% by weight of the total composition. The mineral fillers not only provide low cost, but in some cases contribute strength, weatherability, non-sag properties, and fire retarding features.

One major problem in formulating high filler level compositions has been in achieving workable melt viscosities. As the filler level approaches or exceeds 50% by weight in many filled thermoplastics, the viscosities of the molten blends become too high to pump, roll coat, level out, or to adequately wet the substrates. Compositions based upon both low molecular weight polyethylene and ethylene-vinyl acetate copolymers exhibit this limitation. Occasionally, attempts are made to alter the rheology of the melts by the use of petroleum waxes such as paraffin or microcrystalline wax. However, this almost always results in general degradation of most physical properties. Therefore, it would be an advance in the state of the art to provide filled hot-melt adhesives having a good combination of properties including low viscosity.

It is, therefore, an object of the present invention to provide a novel filled hot-melt adhesive.

Another object of this invention is to provide a filled hot-melt adhesive having low melt viscosities.

A further object of the present invention is to provide a filled modified polyethylene containing hot-melt adhesive which has good physical properties and low viscosity.

Another and further object of this invention is to provide a filled hot-melt adhesive having good adhesion properties which can be applied without the use of a solvent.

In accordance with the present invention we have found that a blend comprising at least one modified polyethylene resin, at least one filler and a tackifying resin provides a hot-melt adhesive which can be applied without solvents and has a novel combination of properties including long term bond aging, improved strength, non-sag properties and low viscosity.

The modified polyethylene has a saponification number of about 3 to 10, preferably 3–5, and is prepared by reacting polyethylene with an unsaturated polycarboxylic acid, anhydride or ester thereof by processes also well known in the art, as for example, U.S. Pat. No. 3,856,889. The polyethylene reacted with this unsaturated component can be low molecular weight or degraded polyethylene. The modified polyethylene can be used alone as the polyethylene component or blends of such modified polyethylene with unmodified polyethylene or blends of modified polyethylene and blends of more than one unmodified polyethylene can also be used.

The fillers suitable in this invention are, for example, calcium carbonate, $TiO_2$, graphite, diatomite, talc, clays, metal oxides, and the like. Such fillers have a particle size not greater than 20 microns, preferably 5 to 10 microns.

The tackifying resins useful in the adhesive compositions of this invention can be a hydrocarbon resin such as DAC-B hydrocarbon resin prepared according to the process disclosed in U.S. Pat. No. 3,701,760 as well as other hydrocarbon resins, synthetic and natural polyterpenes, rosin esters and the like. One such suitable hydrocarbon tackifying resin is a hydrocarbon resin having a softening point of 130° C. and available commercially as Eastman Resin H-130 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a ring and ball softening point of from about 75° to 150° C.; and acid number of from about 0 to 2; a saponification value of less than about 1. Examples of such commercially available resins of this type are "Wingtack 95" as sold by the Goodyear Tire and Rubber Co. and the Sta-Tac and Betaprene H resins sold by the Reichhold Chemical Corp.

Also suitable resins are the rosin ester resins and the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, terpentine, a terpene cut or fraction, and various other terpenes. Particularly useful starting materials are terpene mixtures containing at least 20% β-pinene and/or limonene or dipentene (racemic limonene), and the "sulfate turpentine" obtained as a by-product in the sulfate pulping process.

The hydrocarbon resins and polyterpene tackifying resins can be used either alone or in combination. These tackifying resins can be used in amounts of about 10 percent to about 40 percent by weight of the adhesive composition, preferably about 15 to 30 percent by weight, most preferably 20 percent by weight. The modified polyethylene or a blend of such modified polyethylenes can be used in amounts of 35 to 90 percent by weight in the adhesive formulation, preferably 40 to 60 percent by weight, most preferably 50 percent by weight. The filler can be used in an amount of 10 to 70 percent by weight, preferably 15 to 45 percent by weight, most preferably 30 percent by weight.

The adhesives of the present invention have a particular combination of properties including low viscosity, good bond strength, and good elevated temperature resistance and good aging properties. The components of the adhesive within the above ranges provide an adhesive which has the desired properties. If the amounts of the components are modified from these ranges, the desirable combination of properties of the adhesive are affected. If the base modified polyethylene is used in an amount greater than 90 percent, the adhesion properties of the adhesive are lowered. Likewise, if less than 5 percent tackifier is used the adhesion properties are lowered. If less than 5 percent filler is used the integrity of the bond strength and aging properties are decreased. More than 55 percent filler increases the viscosity so that the adhesive can not be used in present adhesive applicators.

The adhesive compositions of this invention are prepared by blending together the adhesive components in the melt at a temperature of about 160° C. to about 200° C. until a homogeneous mixture is obtained. Various methods of blending materials of this type are known to the art and any method that produces a homogeneous mixture is satisfactory. These components blend easily in the melt and a heated vessel equipped with a stirrer is all that is required. For example, a Cowles Dissolver provides effective mixing for preparing these compositions. Solvents such as hexane, heptane, mineral spirits, xylene, toluene, benzene, chlorinated hydrocarbons, etc., are not needed to prepare the compositions of this invention; however, they can be used if desired.

In addition to the adhesive components, it is desirable for the adhesive compositions to contain about 0.1 percent to about 1.5 percent by weight, preferably about 0.25 percent to 1.0 percent by weight, of one or more antioxidants. Antioxidants that are effective include, for example, tris(di-t-butyl-p-hydroxybenzyl)-trimethylbenzene (Ionox 330), alkylated bisphenol (Naugawhite), zinc dibutyl dithiocarbamate (Butyl Zimate), and 4,4'-methylene bis(2,6-di-tert-butylphenol) (Ethyl 702), tetrakis[methylene-3-(3',5'-di-t-butyl-4-hydroxyphenyl)-propionate]-methane (Irganox 1010), lauryl stearyl thiodipropionate (plastonox 1212), and dilauryl 3,3'-thiodipropionate (Plastanox DLTDP sold by American Cyanamid) and 2,6-di-tert-butyl-p-cresol (BHT) and the like.

Additives such as nucleating agents, pigments, colorants, UV inhibitors, solvents, and the like can also be added to the adhesive compositions of the present invention.

The adhesive compositions of this invention, which are essentially 100 percent solids, have a melt viscosity in the range of 2,000 to 10,000 centipoise at 350° F., preferably 2,000 to 7,000 centipoise, most preferably 5,000 centipoise.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 59.65 weight percent of low-molecular weight modified polyethylene (17,895 g.) having a saponification number of 5, a melt viscosity of 10,000 cp. at 150° C., density of 0.906 g./cc., and ring and ball softening point of 105° C.; about 15 weight percent of talc (4500 g.); about 25 weight percent of Eastman resin H-130 hydrocarbon resin tackifier (7500 g.) having a density of 1.028 g./cc. at 70° F., melt viscosity of about 1000 cp. at 190° C., and ring and ball softening point of 129° C.; 0.1 wt. % (30 g.) of tetrakis[methylene-3-(3',5'-di-t-butyl-4-hydroxyphenyl)propionate]methane; and 0.25 weight percent (75 g.) dilaurylthiodipropionate (DLTDP) are placed in a 500 ml. round bottom resin pot fitted with a mechanical stirrer and nitrogen purge line. The system is purged with nitrogen and heated to 200° C. using a metal bath. The polymer blend is stirred for one hour after melting to insure that the blend is homogeneous. The molten adhesive has a melt viscosity at 350° F. of 2,550 centipoise. Bonds made with this adhesive exhibit excellent aged adhesion to clay coated board and high peel failure temperature performance.

EXAMPLE 2

About 69.65 weight percent low-molecular weight polyethylene (20,895 g.) having a melt viscosity of 9,400 cp. at 150° C., density of 0.906 g./cc., and ring and ball softening point of 104° C.; 30 weight percent (9,000 g.) Eastman Resin H-130 hydrocarbon resin tackifier having a density of 1.028 g./cc. at 70° F., melt viscosity of about 1000 cp. at 190° C. and ring and ball softening point of 129° C.; 0.1 wt. % of tetrakis[methylene-3-(3',5'-di-t-butyl-4-hydroxyphenyl)propionate]methane; and 30 g. of DLTDP are placed in a 500 ml. round bottom resin pot fitted with a mechanical stirrer and nitrogen purge line. The system is purged with nitrogen and heated to 200° C. using a metal bath. The polymer blend is stirred for one hour after melting to insure that the blend is homogeneous. The molten adhesive has a melt viscosity at 350° F. of 2000 centipoise. Bonds made with this adhesive exhibit poor aged adhesion strength.

EXAMPLE 3

Adhesive compositions were prepared using the three components of Example 1 in various percentages and the melt viscosity at 350° F. was determined for these adhesives. The composition and melt viscosity of these adhesives are shown in Table I.

Table I

| Adhesive | Modified Polyethylene, % | Talc % | Resin H-130 % | Melt Viscosity at 350° F. in Centipoise | Aged Adhesion* | Failure Temp., ° F. |
| --- | --- | --- | --- | --- | --- | --- |
| Run 1 | 69.5 | 0 | 30 | 2100 | >36 | 130 |
| Run 2 | 59.65 | 15 | 25 | 2550 | >36 | 128 |
| Run 3 | 48.65 | 30 | 21 | 4400 | >36 | 127 |
| Run 4 | 38.65 | 45 | 16 | 7400 | —>36 | 128 |

*Days @ 125° F. @ 20% relative humidity (clay coated board to clay coated board).

EXAMPLE 4

Adhesive compositions were prepared according to Example 2 using unmodified polyethylene in place of the modified polyethylene used in Example 3. The composition and melt viscosity of these adhesives are shown in Table II.

Table II

| Adhesive | Unmodified Polyethylene, % | Talc % | Resin H-130, % | Melt Viscosity at 350° F. in Centipoise | Aged Adhesion* | Peel Failure Temp., ° F. |
| --- | --- | --- | --- | --- | --- | --- |
| Run 5 | 69.5 | 0 | 30 | 2000 | 9 | 130 |
| Run 6 | 59.65 | 15 | 25 | 2850 | 22 | 120 |
| Run 7 | 48.65 | 30 | 21 | 6300 | >36 | 120 |
| Run 8 | 38.65 | 45 | 16 | 78000 | >36 | 120 |

*Days @ 125° F. @ 20% relative humidity (clay coated board to clay coated board).

The hot-melt adhesives comprising a blend of at least one modified polyethylene resin, at least one filler, and a tackifying resin, provide adhesives having a unique combination of properties for bonding substrates and having excellent adhesive properties. These adhesives provide excellent bond strengths when applied over a broad range of substrates.

The invention has been described in detail with particular reference to certain preferred embodiments thereof, but it will be understood that variations and modifications can be effected within the spirit and scope of the invention.

We claim:
1. An adhesive composition capable of being used as a hot melt adhesive comprising a blend of
   (a) about 35 to 90 percent by weight of at least one modified polyethylene having a saponification number of about 3 to 10 prepared by reacting polyethylene with a member of the group consisting of unsaturated polycarboxylic acid, anhydride and esters thereof,
   (b) about 10 to 70 percent by weight of at least one filler having a particle size of less than 20 microns, and
   (c) about 10 to 40 percent by weight of at least one tackifier resin selected from the group consisting of hydrocarbon resin, polyterpene resin and rosin ester resin.
2. An adhesive composition according to claim 1 wherein said filler is talc.
3. An adhesive composition according to claim 2 wherein said hydrocarbon tackifier resin is DAC-B hydrocarbon resin.
4. An adhesive composition capable of being used as a hot melt adhesive comprising a blend of
   (a) about 40 to 60 weight percent of at least one modified polyethylene having a saponification number of about 3 to 10 prepared by reacting polyethylene with a member of the group consisting of unsaturated polycarboxylic acid, anhydride and esters thereof,
   (b) about 15 to 45 weight percent of at least one filler having a particle size of less than 20 microns, and
   (c) about 15 to 30 weight percent of at least one tackifier selected from the group consisting of hydrocarbon resin, polyterpene resin, or rosin ester resin.
5. An adhesive composition according to claim 5 wherein said filler is talc.
6. An adhesive composition according to claim 5 wherein said hydrocarbon tackifier resin is DAC-B hydrocarbon resin.
7. An adhesive composition capable of being used as a hot melt adhesive comprising a blend of
   (a) about 50 percent by weight of at least one modified polyethylene having a saponification number of about 3 to 10 prepared by reacting polyethylene with a member of the group consisting of unsaturated polycarboxylic acid, anhydride and esters thereof,
   (b) about 30 percent by weight of at least one filler having a particle size of less than 20 microns and
   (c) about 20 percent by weight of at least one tackifier resin selected from the group consisting of hydrocarbon resin, polyterpene resin and rosin ester resin.
8. An adhesive composition according to claim 7 wherein said modified polyethylene has a saponification number of about 3 to 5.
9. An adhesive composition according to claim 8 wherein said filler is talc.
10. An adhesive composition according to claim 9 wherein said hydrocarbon tackifier resin is DAC-B hydrocarbon resin.

* * * * *